Aug. 4, 1942.                A. LYSHOLM                2,292,233
                       INTERNAL COMBUSTION ENGINE
                    Filed March 14, 1940      4 Sheets-Sheet 1

Fig.3.

Aug. 4, 1942.                A. LYSHOLM                2,292,233
                     INTERNAL COMBUSTION ENGINE
                      Filed March 14, 1940         4 Sheets-Sheet 2

INVENTOR.
ATTORNEY.

Aug. 4, 1942.                A. LYSHOLM                2,292,233
                      INTERNAL COMBUSTION ENGINE
                       Filed March 14, 1940        4 Sheets-Sheet 3

INVENTOR.
Alf Lysholm
BY
his ATTORNEY.

Patented Aug. 4, 1942

2,292,233

UNITED STATES PATENT OFFICE 2,292,233

INTERNAL COMBUSTION ENGINE

Alf Lysholm, Stockholm, Sweden

Application March 14, 1940, Serial No. 323,919
In Germany January 3, 1939

25 Claims. (Cl. 123—119)

This application is a continuation-in-part of my copending application U. S. Serial No. 312,281, filed January 3, 1940, now abandoned.

The present invention relates to internal combustion engines and the operation thereof. More particularly, the invention relates to engines of the four-stroke cycle type, usually referred to as "four-cycle" engines. Still more particularly, the invention relates to engines of the kind in which a gaseous fuel-air charge of combustible nature is inducted into and compressed in an engine cylinder before being ignited, but it is to be noted that in certain of its aspects the invention is applicable to injection engines operating as explosion engines or in accordance with the compression ignition or Diesel cycle, and may also be applied in certain instances to two-stroke cycle engines, usually referred to as "two-cycle" engines.

Included among the principal objects of the invention in its several aspects are: To provide increased thermal efficiency as compared with that obtained with engines of conventional construction and cycle of operation; to obtain simultaneously with such increased thermal efficiency an increased power output from a cylinder of given capacity, as compared with conventional engines, by employing a cycle of operation which results in increasing the net useful work obtained from the cylinder; to obtain such increased thermal efficiency in such manner as to result in minimum rate of fuel consumption at a lower percentage of full load operation of the engine than with conventional engines, while at the same time retaining a lowered rate of fuel consumption at full load due to the increased thermal efficiency of the operation, or in other words, to not only provide for increased economy at full load, but to provide better economy over substantially the entire load range of operation of the engine; to obtain improved results of the character noted above without resorting to the use of net compression ratios above that at which fuel of ordinary or low octane may be compressed in an engine cylinder without pre-ignition or detonation; and to provide for increased thermal efficiency and economy of operation which may readily be obtained by simple and inexpensive changes that can be made to existing engines of conventional construction.

In accordance with the general principles of the invention, considered in their broader aspects, the invention contemplates pre-compression of a gaseous charge to be supplied to all or a group of engine cylinders, by means of a compressor common to such cylinder or cylinders and preferably of the rotary type. The end pressure of such pre-compression is made approximately the same as the desired initial pressure from which further net cylinder compression in the engine is to be effected and the pre-compressed medium is first cooled and thereafter introduced into the engine cylinder or cylinders at approximately constant pressure during any one cycle of operation of an engine cylinder. Further, the volume of the charge subjected to net compression in an engine cylinder is limited to less than the volumetric capacity of the cylinder.

It has heretofore been proposed to pre-compress air or gaseous fuel charges for engines and to cool such pre-compressed charges before introducing them into engine cylinders, such procedure ordinarily, however, having been applied for the purpose of "supercharging" engines to increase the amount of power obtainable from an engine of given volumetric capacity. In such instances, however, full charging of the engine cylinders with pre-compressed medium has been contemplated. It has also been proposed in certain instances to utilize variable charging of engine cylinders, by partial charging, as a means for controlling the power output and as a means for compensating for the variations in atmospheric density encountered in aircraft engines operating in widely varying altitudes. Further, it has been proposed in other cases to operate engine cylinders in timed relation with individually associated compressor cylinders, the compressed medium then being allowed to expand either in the compressor cylinder or in the working cylinder to cause compression within the latter cylinder to commence at the lowest possible temperature.

The present invention, however, differs materially from these prior proposals in the method of operation contemplated and the means employed for effecting such operation, as will more fully appear in connection with the ensuing portion of this specification in which the invention in its several aspects will be described, with reference to the accompanying diagrams and drawings in which:

In accordance with that phase of the invention now to be described, the pre-compressed charge is supplied to the engine at super-atmospheric pressure which may, for example, but without limitation, be of the order of two atmospheres absolute and the volume of the charge which is subjected to net cylinder compression is limited to the range of which the lower limit is approximately 30% and the upper limit approximately 70% of the cylinder displacement, preferably of the order of approximately half of such displacement. As will hereinafter more fully be pointed out, the value of superatmospheric pressure at which the charge is supplied under different load conditions may be varied.

By employing a pre-compressed and cooled partial charge it is possible to initiate cylinder compression from a much higher initial pressure than normal, compress the charge in the cylinder through a normal compression ratio without producing either a final compression temperature or a subsequent combustion temperature which is higher or materially higher than normal, and thereafter expand the working charge in the cylinder through a greater expansion ratio than the net cylinder compression ratio. As hereinafter more fully explained, this enables an indicator or work diagram of increased area to be obtained without having to resort to larger cylinder capacity, and at the same time the reduced final expansion temperature which is obtained results in a very considerable increase in thermal efficiency.

In carrying out the procedure above outlined it is distinctly advantageous to employ a rotary rather than a reciprocating type compressor since the former is capable of delivering the charge, particularly in the case of supply to a multi-cylinder engine, at a definite and substantially constant pressure, while with the latter type this result can be obtained only by the use of an air chamber or receiver, which, moreover, must be of relatively large volume if substantial momentary pressure variations are to be avoided. In addition, for engine charging purposes the rotary compressor offers the further material advantages of being relatively very compact and light in weight for a given capacity, it may be driven at high speeds, and it is also more readily adaptable to different types of engine drives, inclusive not only of the mechanical drives by belt, gear, chain, or the like, but also of drive from a high speed gas turbine operated by engine exhaust gases. This latter type of drive is particularly important for large engines.

Figures 1, 1A, 2, 2A:
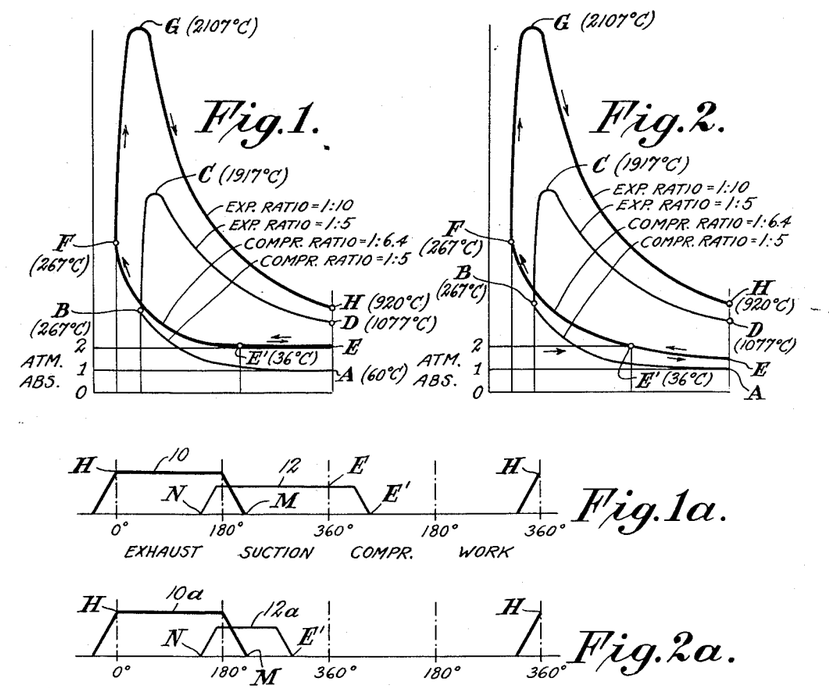
Fig. 1 is a diagram showing comparative indicator cards for a conventional engine and one embodying the present invention.
Fig. 1a is a diagram illustrative of valve timing in accordance with the new cycle shown in Fig. 1.
Fig. 2 is a diagram similar to Fig. 1, comparing another variant of the present method with a conventional cycle.
Fig. 2a is a valve timing diagram for the new method indicated in Fig. 2.

Referring now more particularly to the diagram of Fig. 1, there is illustrated therein the cycle (at full load) of the process according to the present invention in its principal phase, compared with the cycle (at full load) of a conventional engine of usual construction. In the diagram the area ABCD constitutes the indicator or working diagram of a conventional four-cycle engine. In accordance with the cycle represented by this area, suction takes place at atmospheric pressure, that is at A, compression is effected along the line AB, at which point the charge is ignited, the maximum pressure rises to point C, and expansion takes place along line CD. Thereafter the pressure drops to atmospheric during the exhaust and induction phases of the cycle.

The diagram area EFGH represents the process according to the present invention. In this instance induction of the cylinder charge takes place at increased initial pressure, for example, at two atmospheres absolute, as shown at E. At the end of the induction stroke, however, the charge in the cylinder is not confined therein. For example, the inlet valve is not closed at this time so that during a part of the ensuing compression stroke, a part of the charge inducted into the cylinder is returned to the admission conduit. At point E' the inlet valve is closed and during the remainder of the compression stroke compression takes place along the line EF. At point F ignition occurs with resultant rise of pressure to point G and subsequent expansion along line GH. At point H the cylinder is opened to exhaust.

The curves shown on the diagram are calculated in accordance with a polytropic having the exponent $k=1.3$ on the basis of a constant specific heat $c_p=0.25$. In the case of the conventional cycle, the compression ratio is 1:5 and the expansion ratio is the same. In the other case the compression ratio is 1:6.4 and the expansion ratio is 1:10.

From the curves calculated as above, the temperature and pressure conditions can be read directly from the diagrams. In both cases, the final compression temperatures (points B and F) are the same, 267° C. The maximum temperature in the case of the conventional diagram (point C) is 1917° C., while in the other case the maximum temperature (point G) is 2107° C. On the other hand, the final temperature in the case of the conventional cycle D is 1077° C. which is materially higher than the final temperature in the case of the other diagram H which is only 920° C.

In the case of the conventional cycle there is a temperature drop of 840° C., while in the other diagram the temperature drop amounts to 1187° C. This increased temperature drop in the new cycle represents an extraordinary increase in thermal efficiency as compared with the conventional cycle.

The same general comparison applies with respect to what is illustrated in Fig. 2. In this figure the conventional diagram is identical with that illustrated in Fig. 1. The new cycle represented in Fig. 2 differs from that in Fig. 1, however, in the fact that instead of utilizing the entire suction stroke and subsequently rejecting a portion of the inducted charge, only a portion of the suction stroke is utilized. As before, the charge is made available for use in the cylinder at a pre-compressed pressure of two atmospheres absolute. On the suction stroke the inlet valve is closed at point E' and thereafter the charge inducted up to this point expands in the cylinder to the pressure represented by the point E. During the first portion of the return stroke of the piston, up to point E', the charge is first compressed back to pressure E' and thereafter is further compressed along line E'F. The expansion and subsequent compression along lines E'E and EE' represent no net loss or gain to the working diagram and it will be apparent that in so far as the diagram area is concerned, late closing of the inlet valve to reject a portion of a previously inducted charge or early closing of the inlet valve during the suction stroke, to induct only a partial charge, operate to produce the same results. In the case where the inlet valve is closed early to limit induction to a partial charge, the compression from the point E to the point E' represents merely a reversal of the expansion phase represented by line E'E. Therefore, for the purposes of this specification and the claims appended hereto, the effective compression in the cylinder will be referred to as net compression, which term is to be understood as representing the compression effected along the line E'F which in the case of Fig. 1 coincides with the total actual compression and in the case of Fig. 2 coincides with the compression effected above the induction pressure.

Since the conditions from which net compression is commenced from the point E' are the same in both examples illustrated in Figs. 1 and 2, the remaining pressure and temperature conditions in the two cases are alike and therefore those obtaining in the diagram of Fig. 2 need not be further discussed in detail.

In Figs. 1a and 2a, valve lift diagrams corresponding respectively to the diagrams for the new working processes shown in Figs. 1 and 2, are shown, these valve lift diagrams being expressed in terms of valve action with respect to crank angle. In Fig. 1a, the numeral 10 denotes the line representing exhaust valve lift and 12 denotes the line representing inlet valve lift. At point H, which is represented on the diagram as coinciding with bottom dead center at the end of the power stroke, the exhaust valve is fully open and remains fully open during the ensuing exhaust stroke, being fully closed at point M on the suction stroke. The inlet valve commences to open at point N on the exhaust stroke and remains fully open during the succeeding intake stroke and the first part of the ensuing compression stroke, arriving at fully closed position at point E'. As will be observed from the diagram, the conventional overlap between opening of the inlet valve and closing of the exhaust valve is retained, the difference in the timing as compared with convention timing being the delay of closing the inlet valve until after a substantial portion of the compression stroke has been effected.

In Fig. 2a, the valve timing which corresponds to the process shown in Fig. 2 is indicated by the exhaust valve lift line 10a and the inlet valve lift line 12a. The timing represented by line 10a is the same as that represented by line 10 of Fig. 1a. In the present instance, however, the inlet valve, which opens at the same point in the cycle as in the diagram of Fig. A, is kept open only for a portion of the ensuing suction stroke, reaching fully closed position at point E', well ahead of the end of this stroke.

Figure 3:
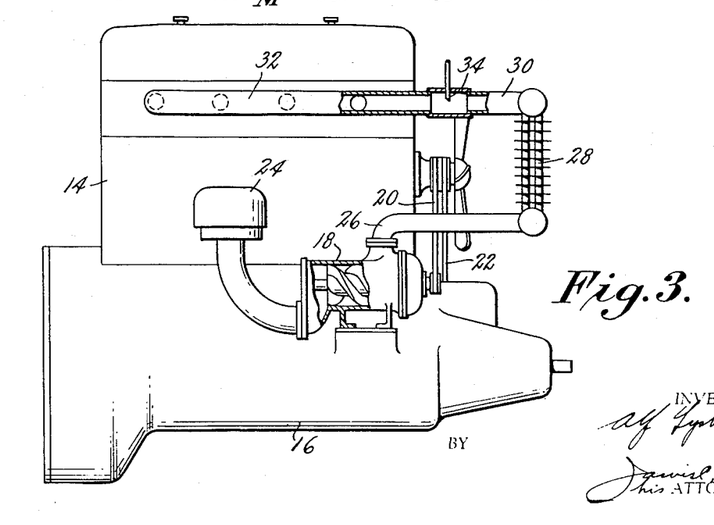
Figs. 3 and 4 are side elevation and transverse sectional views respectively of an engine embodying the invention.
Figures 4, 6:
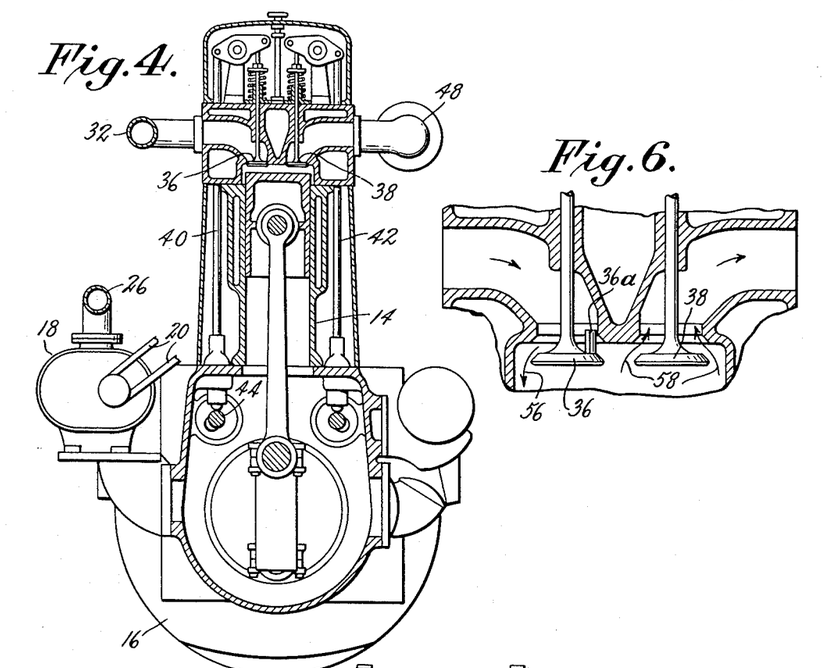
Fig. 6 is a fragmentary section on enlarged scale through the valve end of an engine cylinder operated in accordance with the invention.

In Figs. 3 and 4 there is shown more or less diagrammatically in side elevation and in transverse section through a working cylinder, respectively, an engine adapted to carry out the new process above described.

In these figures 14 indicates the cylinder block of a multi-cylinder four-cycle engine, the crank case of which is shown at 16. 18 represents a rotary compressor which advantageously is of the positive displacement screw type and which is driven in the embodiment illustrated by means of a belt 20 from the engine fan pulley, the latter being driven from the crankshaft of the engine in any suitable manner as, for example, by means of a belt 22.

Combustion air is drawn in by the compressor through the air cleaner 24 and is forced by the compressor through the conduit 26 to an air cooler indicated diagrammatically at 28, which cooler may be either air or water cooled. From the cooler 28 the air is delivered through conduit 30 to the manifold pipe 32 and in the embodiment illustrated the desired combustible fuel-air mixture is obtained by injection of fuel through means of any suitable fuel spraying device indicated diagrammatically at 34.

In so far as the present invention is concerned, the specific method of obtaining the desired combustible mixture of fuel and air is not material and as will further be evident from the preceding discussion with respect to Figs. 1 and 2, it is also not material whether the desired partial charging of the cylinders is obtained by advanced or delayed closing of the inlet valve as compared with the closing of such valve in accordance with the conventional cycle of operation.

Accordingly, in the section shown in Fig. 4, in which overhead inlet and exhaust valves 36 and 38, respectively, are shown, which valves are respectively actuated by conventional valve and push rod mechanisms indicated at 40 and 42, the cam 44 for controlling the timing of the inlet valve has been shown conventionally, it being understood that either advanced or retarded closing of the valve may be secured as desired by appropriately dimensioning the peripheral extent of the lift portion of the cam.

Figure 5:
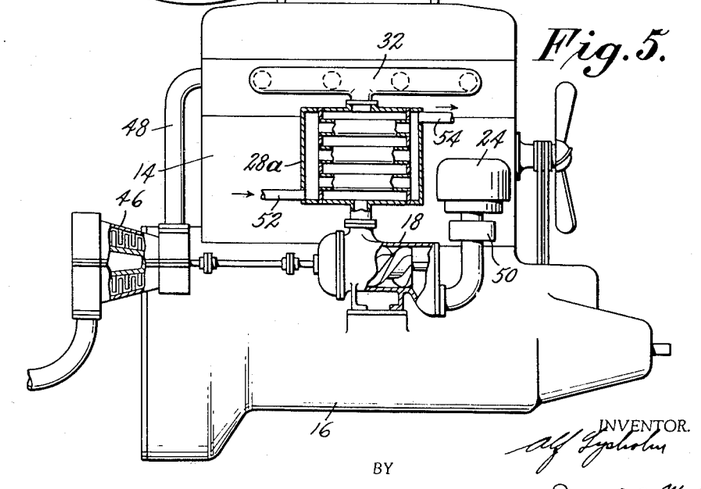
Fig. 5 is a side elevation of an engine illustrating another embodiment of the invention.

In the form of engine illustrated in Fig. 5, which in so far as the general construction is concerned may be assumed to be the same as that shown in Figs. 3 and 4, the compressor 18 instead of being driven at a speed directly proportional to engine speed by mechanical means, is driven by an exhaust gas turbine 46, the inlet of which is connected to the exhaust pipe 48 of the engine. In this form, the air drawn in through the cleaner 24 is passed through a carbureter 50 which operates to produce a combustible gas charge which is compressed in the compressor and delivered through the cooler 28a from which it passes to the engine manifold 32. The cooler shown in this embodiment is of the liquid cooled variety to which cooling liquid is admitted through pipe 52 and discharged through pipe 54. Such a cooler may advantageously be connected into the main engine cooling system in the case of a liquid cooled engine. Obviously, in so far as the present invention is concerned, the carbureter 50 which is located on the intake side of the compressor, can be of the ordinary aspirating variety, and may equally well be located on the discharge side of the compressor, in which event it may be of any desired known form adapted to effect carburetion of a compressed air charge.

As previously noted, overlap is advantageously made use of between opening of the exhaust valve and closing of the inlet valve and in order to avoid direct flow of a portion of the fresh charge from the inlet to the exhaust during the period of overlap, the inlet valve 36 may advantageously be provided with a baffle or skirt 36a, located at the side of the valve adjacent to the exhaust valve, to cause the incoming charge to be directed away from the exhaust passage in the path indicated generally by arrow 56 so as to produce substantially completely effective scavenging of the burnt gases flowing out of the cylinder in the path indicated generally by the arrows 58.

In accordance with a further phase of the invention, the partial charging of the cylinder may be effected by special valve timing involving exhaust valve timing different from the conventional. Such exhaust valve timing may be varied in different ways and may be used in combination with different characters of inlet valve timing.

Figure 7:
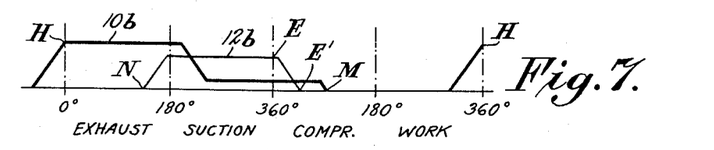
Figs. 7 to 9, inclusive, are valve diagrams of similar nature showing different variants of valve timing contemplated by the invention.
Figure 8:
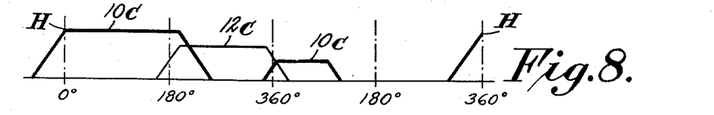
Figure 9:
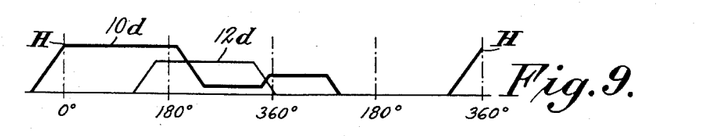

Valve timing arrangements in accordance with this phase of the invention are illustrated in diagrams of Figs. 7 to 9, inclusive.

In the diagram shown in Fig. 7, the exhaust valve, the lift of which is indicated by line 10b, is fully opened at bottom dead center and remains open during the exhaust and induction strokes and also during a portion of the following compression stroke. As will be observed from the diagram, the valve is partially closed during the induction stroke and is finally closed from its partially closed position at point M in the compression stroke. The inlet valve, the lift of which is indicated by line 12b, opens at point N ahead of the end of the exhaust stroke and remains open during the induction stroke, closing at point E' during the compression stroke. The point of final closure of the exhaust valve M, may advantageously lie about the middle of the compression stroke, or slightly before the middle thereof and may be, as indicated, somewhat later in the cycle than the point of closure of the inlet valve at point E'. During the time when the exhaust valve is partially closed, the extent of such partial closure is such as to admit only of throttled flow through the valve opening. It will be evident that the desired character of valve lift may readily be obtained by provision of a valve cam of suitable contour in known manner.

In the arrangement indicated in Fig. 8, the difference, as compared with Fig. 7, is that the exhaust valve, the lift of which is indicated by line 10c, is fully closed during most of the latter part of the induction stroke. Just prior to the end of this stroke, however, the exhaust valve again opens as indicated by the curve 10c', remaining open during the first part of the ensuing compression stroke. As indicated in the figure, the subsequent opening of the exhaust valve as indicated by line 10c' may be only a partial opening. In this instance the inlet valve, the lift of which is indicated by line 12c, closes somewhat earlier during the compression stroke than in the arrangement shown in Fig. 7.

In the arrangement shown in Fig. 9, the exhaust valve, the lift of which is shown by curve 10d, is again fully open during the exhaust stroke. In this instance, however, after being partially closed during the latter part of the induction stroke, it is again opened somewhat wider (but not fully) during the first part of the compression stroke.

It will be apparent that in all of the several arrangements shown in Figs. 7 to 9, a part of the charge inducted into the cylinder will flow therethrough and out the exhaust before both valves are closed and net compression takes place. Thus, for this purpose direct injection of fuel into the engine cylinders after both valves have been closed should be employed to prevent waste of fuel through the exhaust prior to commencement of compression in the cylinder.

In the arrangement shown in Fig. 7, a part of the inducted air charge blows through the cylinder during the induction stroke, such blow-through being restricted by the partially open exhaust valve in order to avoid loss of an undue quantity of pre-compressed air. Such throttled blow-through will, however, operate to give complete scavenging of the cylinder. During the first part of the ensuing compression stroke, the throttled flow through the partially open exhaust valve continues and until the inlet valve closes the point E' there may be in addition some return flow of the air charge through the inlet valve. The commencement of net cylinder compression is determined by the time of closure of the exhaust valve.

In the arrangement shown in Fig. 8, scavenging blow-through occurs during the early part of the induction stroke and the amount of the charge to be compressed in the cylinder is then determined by the subsequent opening and closing of the exhaust valve during the ensuing compression stroke, net compression not commencing until the exhaust valve has closed on this stroke. As will be apparent from a comparison of Figs. 7 to 9, the arrangement shown in Fig. 9 is, in effect, a combination of the arrangement shown in Figs. 7 and 8 wherein a throttled scavenging blow-through is provided during the induction stroke and during the early portion of the ensuing compression stroke the exhaust valve is opened to a somewhat greater extent to permit the portion of the charge which it is desired to eject from the cylinder to escape through the exhaust.

Figures 10, 12:
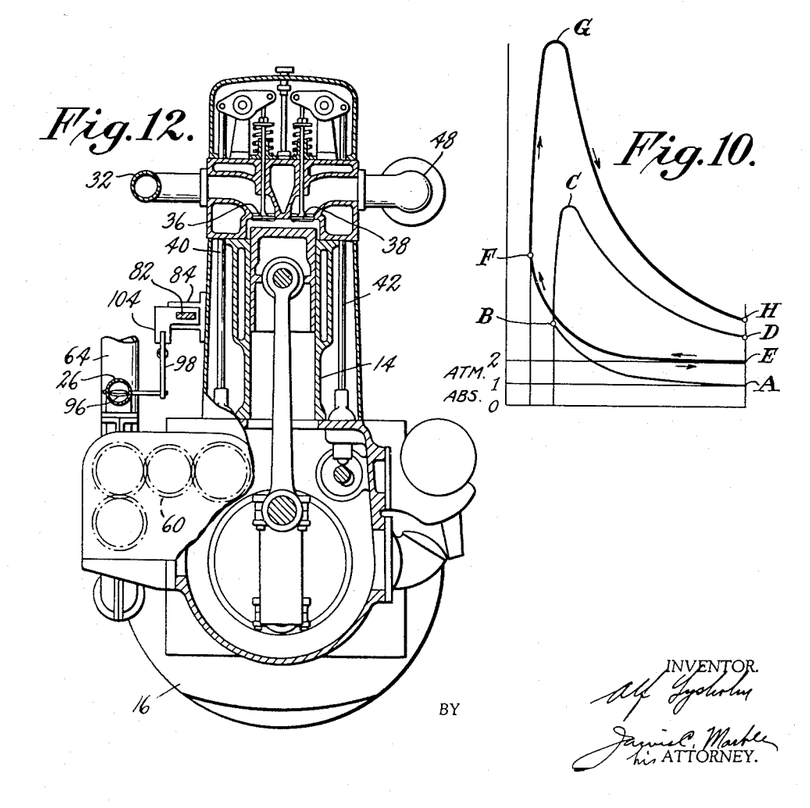
Fig. 10 is a diagram similar to Figs. 1 and 2 and illustrative of the character of operation obtained with timing of the sort shown in Figs. 7 to 9.
Fig. 12 is a transverse section through one of the cylinders of the engine shown in Fig. 11.

In Fig. 10 a diagram similar to those of Figs. 1 and 2 is shown, illustrating the new cycle in its relation to a conventional cycle. In this instance the indicator diagram for the conventional cycle is indicated by the area ABCD and the area EFGH represents the indicator diagram for the new cycle.

For reasons which will be understood from the previous discussion with reference to Figs. 1 and 2, it will be apparent that in the present case the area EFGH will be substantially greater than the area ABCD, and that substantially increased temperature drop in the cycle is obtained with consequent material increase in thermal efficiency.

The arrangements illustrated in Figs. 7 to 9 differ principally from the arrangements discussed in connection with Figs. 1 and 2 in that positive scavenging flow through the cylinder is effected. This requires the precompression of more air, but such loss is more than compensated for by the practical advantages to be gained through improved scavenging, cooling of exhaust valve by the scavenging air, etc.

It is to be noted in connection with the several methods of operation and the constructions hereinbefore described, that the factors which are required to produce an engine operative in accordance with the invention, from an engine of conventional construction, are relatively very simple. Engines of conventional construction are usually made with substantial factors of safety in so far as strength of working parts are concerned, and the advantages of the present invention may readily be obtained if desired by utilizing a conventional engine by changing only the cam shaft or cam shafts in order to provide the special forms of cam required to give the desired valve timing, and adding a compressor and air cooler to the induction system of the engine. Thus, existing engines may readily be practically and cheaply converted so as to be capable of producing higher power output than that for which they were originally designed, which output is obtained with substantial improvement in the fuel economy of the engine. Further, it is to be noted that in applying the principles of the invention it is not necessary to resort to the use of special high octane fuels in order to secure proper operation since in order to obtain the increased power and economy which is attained, it is not necessary to resort to net compression ratios in the engine cylinder greater than those which may be employed with ordinary fuels without danger of pre-ignition or detonation.

In the preceding discussion, the principles of the present invention and their application and relation to conventional engine structures and modes of operation have been considered only in connection with full load operation. In one of its aspects the present invention aims at the securing of improved fuel economy not only under full load operating conditions, but also under part load operating conditions, this latter being particularly important in many instances since in many fields of operation, internal combustion engines are operated at full load for only a small proportion of their total operating time. To this end the present phase of the invention contemplates modification of the previously described modes of operation under part load conditions by the provision of special part load control of the charge supplied to the engine which operates to maintain a relatively very low rate of fuel consumption over a wide range of loads.

Figure 11:
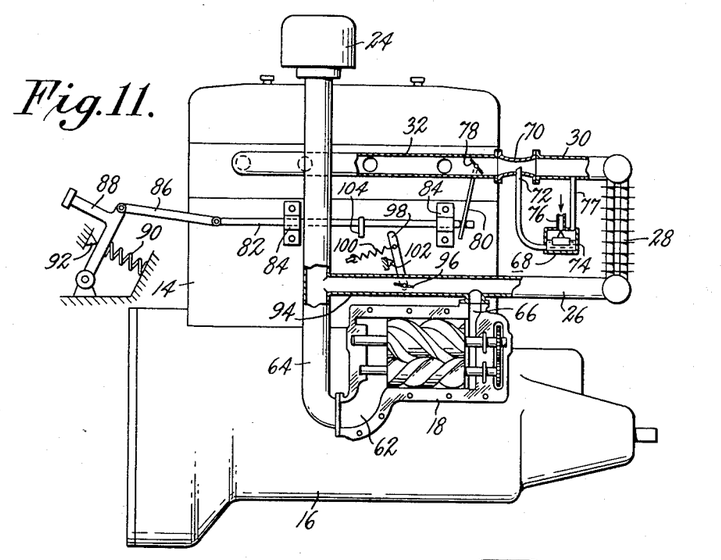
Fig. 11 is a more or less diagrammatic side elevation of an engine provided with control means in accordance with the invention.

Referring now more particularly to Figs. 11 and 12, an engine of the carbureter type is illustrated, which embodies the principles of this phase of the invention. Since the engine is of the carbureter type in which a combustible fuel-air mixture is inducted into the cylinders, the engine valves will be considered to be timed in accordance with the timing indicated in Fig. 1a or Fig. 1b, rather than in accordance with any of the timing arrangements shown in Figs. 7 to 9.

In this embodiment the compressor 18 is driven from the crankshaft of the engine through the gear train indicated generally at 60.

The suction side of the compressor 62 is connected to the suction conduit 64 to which air is admitted through the cleaner 24, and the discharge side 66 of the compressor is connected by means of the discharge conduit 26 and cooler 28 to pipe 30 connected to the intake manifold 32 through which the charge is distributed to the several engine cylinders.

In the embodiment illustrated, the compressed air charge is supplied with fuel by a pressure type carbureter diagrammatically indicated at 68, which in the form shown includes a Venturi tube 70 in the throat of which is located the spray nozzle 72 to which fuel is supplied from the fluid chamber 74. Fuel is supplied to this chamber through the supply pipe 76 and a balancing connection 77 communicating with pipe 30 is provided. The specific form of carbureter employed is not germane to the present invention and may be of any well known type embodying either fixed or variable orifice nozzles for providing the desired fuel-air ratio for the mixture supplied to the engine cylinders.

A throttle valve 78, which in the embodiment shown is of the usual butterfly type, located at the inlet of the manifold 32, is provided for controlling operation of the engine, this valve in the embodiment shown being actuated through the medium of lever 80 pivotally connected to a link rod 82 slidably mounted in suitable brackets 84 on the engine and connected by means of link 86 to a throttle control shown in the form of a conventional accelerator pedal 88. Pedal 88 is biased by spring 90 to a position limited by an abutment 92 (which may be adjustable), corresponding to closed or substantially closed position of the throttle valve 78. The discharge side of the compressor is connected by means of a by-pass conduit 94 to the inlet or suction side 62 and a control valve 96 is provided in this by-pass conduit. In the form illustrated, this valve is also of the butterfly type and is controlled by a lever 98 which is biased by a spring 100 to a position against an abutment 102 corresponding to fully or substantially fully open position of the valve. The operating lever 98 for valve 96 is positioned so that it is in the path of movement of an operating lug or arm 104, adjustably secured to link 82 so as to enable it to be fixed in desired adjusted position axially of this link.

The operation of the above described form of engine is as follows:

At idling and low partial loads, the by-pass valve 96 is open. The air delivered by the compressor 18 under such conditions will thus be returned to the suction side of the compressor through the by-pass conduit 94 and the charge supplied to the engine cylinders will be pre-compressed to only a very small degree, if at all. Under such conditions the control pedal will be only partially depressed. Upon further depression of the pedal to compensate for increased load, the control member 104 on the link 82 comes into contact with lever 98. The adjustment of this control member is such that these parts are brought into contact in a throttle position corresponding to about one-third to one-half full load, the throttle 78 not being fully open under this condition. Further depression of pedal 88 operates to turn the by-pass valve 96 toward closed position and consequently throttle the flow through the conduit 94. This results in raising the pressure of the pre-compressed charge delivered to the engine. At full load valve 96 is fully closed, the capacity of the compressor being then utilized to its full extent and operation with which the process full pre-compression, in accordance with the process illustrated in Fig. 1 or that illustrated in Fig. 2 is effected, depending upon whether the inlet valves are timed in accordance with the diagram of Fig. 1a or in accordance with that of Fig. 1b.

It is to be noted in connection with the above described variable control that during the range in which the by-pass conduit 94 is being throttled by valve 96, the butterfly throttle valve 78 is in the range of movement near its fully opened position in which the valve approaches a position parallel to the axis of the conduit, so that in this range the variation in the cross-sectional area for flow past the throttle valve is not materially varied. By combining the partial charge of the cylinders as previously described and control of the compressor as described above, the point at which the minimum rate of fuel consumption, in terms of weight of fuel per horse power hour developed, is obtained, is at a smaller percentage of load than with a conventional engine. At the same time, the reduced rate of fuel consumption at full load, as compared with conventional operation, is retained. As a consequence, an unusually flat fuel consumption curve is obtained over the entire range within which the engine operates under normal conditions. Through control of the compressor, the quantity of air supplied at increased load will be increased up to a definite maximum value while in the lower load range the compressor does not operate to substantially increase the quantity of air inducted into the engine.

The above noted characteristics have been proved by actual test results of which the following may be given by way of example:

A conventional four-cycle gasoline engine having a displacement of 7.75 liters, operating in accordance with the conventional cycle delivered 100 H. P. at 1600 R. P. M. with a fuel rate of 273 grams per horse power hour, and a maximum of 125 H. P. at 2000 R. P. M. with a fuel rate of 284 grams per horse power hour. This engine was converted for operation in accordance with the present invention. With the compressor disconnected, the maximum power output from the engine amounted to 68 H. P. the fuel consumption, however, amounting to only 200 grams per H. P. hour. This latter operation corresponds to that which would occur with the engine shown in Fig. 11, with the pedal 88 depressed to the point where the regulating member 104 is just brought into contact with the control lever 98. The pressure of the charge supplied to the engine was then increased by 400 millimeters mercury by operation of the compressor. This increase in induction pressure resulted in an increase of the power output to 130 H. P. at 1600 R. P. M. The fuel consumption was, however, increased to only 207 grams per horse power hour for this output. Increase of the induction pressure by 800 millimeters mercury resulted in an increase in the power output to 167 H. P., with an accompanying increase in the fuel consumption rate to only 214 grams per horse power hour.

The fuel consumption of 273 grams per horse power hour obtained with the engine delivering 100 H. P. at 1600 R. P. M. in accordance with the conventional cycle represented the best fuel economy. On the other hand, when operated in accordance with the new cycle, the fuel consumption rate did not rise to 273 grams per horse power hour until the engine load was reduced to the relatively very low value of 34 H. P. With the motor operating in conventional fashion, the rate of fuel consumption at this relatively very low load would be, as is well known, very much higher than the best economy represented by the fuel rate of 273 grams per horse power hour.

Figure 13:
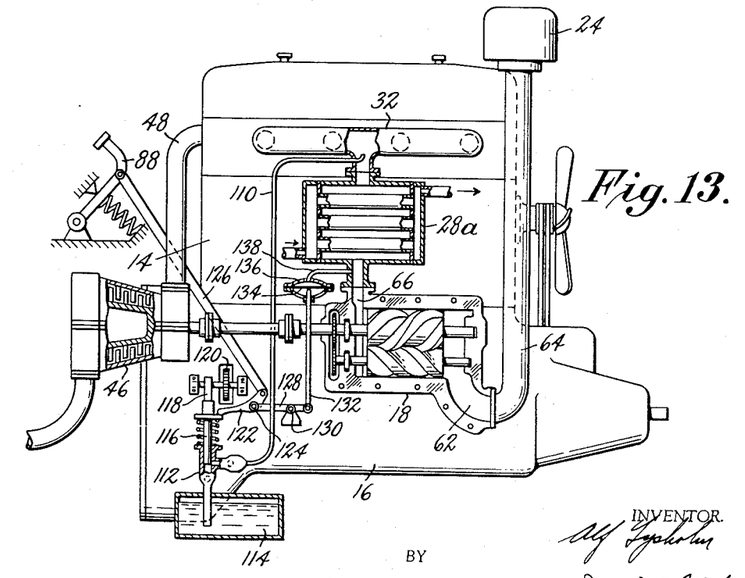
Fig. 13 is a view similar to Fig. 11, showing still another form of control system within the scope of the invention.

In Fig. 13 still another form of engine is illustrated in which variable control of the pre-compressed charge is effected. In this instance the charge supplied to the engine cylinders is again in the form of a combustible fuel mixture so again it will be considered that the partial charging of the engine cylinders is effected in accordance with the timing illustrated in the Figs. 1a and 2a, rather than in accordance with the timing illustrated in Figs. 7 to 9.

The compressor 18 in the present embodiment, instead of being driven at a speed directly proportional to engine speed through gearing or the like is driven by means of the exhaust gas turbine 46 connected to the engine exhaust pipe 48. The suction side 62 of the compressor draws air through the cleaner 24 and intake pipe 64 and delivers the air from the discharge side 66 through the cooler 28a which is of the liquid cooled type shown in Fig. 5.

In this instance, instead of employing a vaporizing type of carburetor, the fuel required to form the necessary combustible charge is injected into the inlet of the manifold 32 through a fuel supply conduit 110 which constitutes the discharge line of a plunger type fuel pump 112 drawing fuel from a source of supply 114. The quantity of fuel delivered to the engine by the pump is metered and the rate at which fuel is supplied is determined by controlling the length of the stroke of the pump plunger 116, which plunger is actuated by an engine driven cam 118 connected to the crankshaft or cam shaft of the engine through suitable gearing indicated at 120.

Control of the stroke of the pump plunger is effected by variably limiting the length of the suction stroke through the medium of a control member 122 in the form of a bellcrank, one arm of which is adapted to provide an adjustable abutment for stopping the pump plunger on its outward or suction stroke. The bellcrank 122 is pivotally mounted upon an adjustable pivot 124 and the other arm is pivotally connected to a link 126 connected to the control pedal 88. The adjustable pivot 124 is provided by one end of a lever 128 pivotally mounted intermediate its ends on a fixed pivot 130 and at its other end connected to a link 132 which abuts at one end against a diaphragm 134. Diaphragm 134 forms a wall of a diaphragm chamber 136 which is placed in communication with the discharge side of the compressor by means of a connection 138.

In this embodiment the supply of fuel to the engine is controlled by operation of the pedal 88, the linkage connecting this pedal with the pump being such that (assuming pivot 124 to be stationary) depression of the pedal moves the bellcrank control member so as to permit increased length of suction and delivery strokes of the pump to increase the amount of fuel supplied.

The output of the compressor 14 is dependent upon the speed of operation of the exhaust gas turbine 46, which in turn operates at different rates of speed corresponding to the quantity and pressure of the exhaust gases delivered from the engine. When the control pedal is depressed to increase the rate of fuel supply to the engine, the pressure of the exhaust gases increases so that the exhaust gas turbine is operated at a higher rate of speed. The compressor 18 thus commences to deliver more air so that the induction pressure of the charge is increased. This augmented pressure of the charge requires more fuel in order to maintain a proper mixture ratio and this is obtained by the fact that in response to the augmented pressure, the diaphragm 134 moves the link 132 downwardly and this movement is translated by lever 128 into upward movement of the adjustable pivot to which the bell crank 122 is attached. Assuming a momentarily constant position of the pedal 88 when this occurs, the upward movement of the pivot 124 will result in a lengthened operating stroke for the pump and a correspondingly increased fuel supply to the engine manifold.

Control of the pressure at which the charge is delivered to the engine at different loads is not effected by direct compressor control, but is effected indirectly through the operation of the exhaust gas turbine. At low loads, insufficient exhaust gas will be available to permit of full load operation of the compressor and little, if any, increase in pressure of the charge delivered to the engine will be effected. As the load, and consequently the energy available in the exhaust gases increases, the speed of operation of the compressor will accordingly be increased and the induction pressure of the charge delivered to the engine correspondingly increased. Thus, the same character of control as that obtained in the arrangement shown in Fig. 11 is secured.

It is particularly to be noted that the cycle of engine operation in accordance with the present invention is particularly advantageous for engines utilizing exhaust gas turbines to drive the compressor. With engines operated in accordance with the conventional cycle, the temperature at which the gases are exhausted from the engine cylinder is ordinarily so high that such gases have to be diluted with air or otherwise cooled before they can be used practically in a turbine. On the other hand, due to the relatively low exhaust temperature which is obtainable when operating in accordance with the present invention, the exhaust gases may be admitted directly to an exhaust gas turbine, even under full load operating conditions, so that all difficulties due to excessive exhaust gas temperature and complications required to compensate therefor, may be dispensed with.

While hereinbefore discussing the various forms which the invention may take, only fixed valve timing has been considered, it will be apparent that in so far as the present invention is concerned, valve operating mechanisms of known form may be employed by which the timing of the valves may be altered in relation to the engine cycle under different conditions of load and speed.

Also, for the sake of simplicity, the discussion of the application of the principles of the invention has been confined to four cycle engines. It will, however, be understood that the invention is not necessarily limited to four-cycle engines, but may also be applied to two-cycle engines, particularly of the scavenging type, in which the port control is arranged so that net compression commences only at a delayed point in the compression stroke. Since the invention further is applicable to injection engines of the type in which the fuel is injected in metered quantities directly into the engine cylinders, it becomes available for use in engines adapted to be operated by compression ignition and it will be understood that in so far as the specific manner of charge formation in the cylinders, ignition, expansion, and exhaust thereof are concerned, various desired procedures of known character may be followed.

Since it will be apparent from the various embodiments hereinbefore described that the charge which is pre-compressed by the compressor may be either an air charge to which fuel is subsequently added to form the cylinder charge, or a charge consisting of a combustible fuel-air mixture formed prior to pre-compression, it will be understood that the term gas or gaseous charge, unless specifically modified, is to be considered in the appended claims as inclusive of both air and a combustible fuel-air mixture.

From the foregoing it will be evident that the invention in its several phases may be employed in many different specific ways and that certain of the features of the invention may in certain instances be employed to the exclusion of others. It is accordingly to be understood as embracing all forms of apparatus and procedures falling within the scope of the appended claims.

I claim:

1. The improved method of operating an internal combustion engine which includes the steps of precompressing a gas for subsequent further compression in the engine, to a precompressed super-atmospheric pressure substantially the same as that from which net cylinder compression is to be initiated, cooling the precompressed gas, introducing the precompressed and cooled gas from a common source into all or a group of the engine cylinders at substantially constant pressure, limiting the volume of the gaseous charge confined in any one cylinder for net compression therein to substantially less than the volumetric capacity of the cylinder, compressing the confined charge through a selected compression ratio in the cylinder for ignition therein and expanding the ignited charge in the cylinder through an expansion ratio substantially greater than said selected compression ratio.

2. A method according to claim 1, characterized by the fact that precompression is effected by a rotary compressor constituting the common source of supply for all or a group of the engine cylinders.

3. A method according to claim 1, characterized by the fact that the precompressed and cooled charge is delivered to the engine at a pressure of the order of two atmospheres, absolute.

4. A method according to claim 1, in which the charge confined in the cylinder for net compression therein is limited to a range of between approximately 30% and 70% of the volumetric capacity of the cylinder.

5. A method according to claim 1, characterized by four-cycle operation of the engine and the fact that the charge confined in the cylinder is limited by delaying closure of the cylinder inlet until a portion of the previously inducted charge is rejected to the induction system by the piston during the early part of the compression stroke.

6. A method according to claim 1, characterized by the fact that a charge of air is inducted into the cylinder and the volume thereof confined in the cylinder is limited by delaying closure of the cylinder outlet until a portion of the charge is rejected to the exhaust by the piston during the early part of the compression stroke.

7. A method according to claim 1, characterized by four-cycle operation of the engine and the fact that the charge confined in the cylinder is limited by delaying the closure of both the inlet and the outlet of the cylinder to reject portions of the charge to both the induction system and exhaust by the action of the piston during the early part of the compression stroke.

8. A method according to claim 1, characterized by the fact that a charge of air is inducted into the cylinder and the volume thereof confined in the cylinder is limited by rejection of a portion thereof to the exhaust by the action of the piston during the early part of the compression stroke through a throttled cylinder outlet.

9. A method according to claim 1, characterized by four-cycle operation of the engine and by the fact that air is inducted into the cylinder and a portion thereof rejected to exhaust during the suction stroke and the early portion of the exhaust stroke to scavenge the cylinder and to confine in the cylinder a charge for net compression therein the volume of which is substantially less than the volumetric capacity of the cylinder.

10. The improved method of operating an internal combustion engine which includes the steps of precompressing a gas for subsequent further compression in the engine, to a precompressed superatmospheric pressure substantially the same as that from which net cylinder compression is to be initiated, cooling the precompressed gas, introducing the precompressed and cooled gas from a common source into all or a group of the engine cylinders at substantially constant pressure, limiting the volume of the gaseous charge confined in any one cylinder for net compression therein to substantially less than the volumetric capacity of the cylinder, compressing the confined charge through a selected compression ratio in the cylinder for ignition therein, expanding the ignited charge in the cylinder through an expansion ratio substantially greater than said selected compression ratio, and varying the weight of the charge subjected to net compression at different loads by reducing the pressure of precompression at partial loads.

11. A method according to claim 10, characterized by the fact that the precompression pressure is reduced to substantially atmospheric in the lower load range the upper limit of which is from one-third to one-half full load and that at such lower load range the charge admission is governed primarily by an engine throttle.

12. A method according to claim 10, characterized by the features that a throttle control is provided for the engine and that in the upper load range of operation of the engine the precompression pressure of the charge is varied with variations in load and supplied to a substantially open throttle, whereby to render the throttle substantially inoperative as a control in this range, and that in the lower load range of operation of the engine the precompression pressure is reduced to atmospheric and the charge control is governed by the throttle.

13. A method according to claim 10, characterized by the fact that the precompressed charge is air and that fuel is added thereto on the inlet side of the engine throttle to form a combustible gaseous mixture.

14. A method according to claim 10, characterized by the fact that the precompressed charge is air and that metered quantities of fuel of variable value are injected thereinto under the influence of variations in the value of the precompression pressure.

15. A method according to claim 10, characterized by the fact that the variable precompression pressure is obtained by by-passing variable quantities of the precompressed charge to a zone of atmospheric pressure.

16. An internal combustion engine including a group of one or more cylinders, an induction system for supplying a gaseous charge to said cylinders including a rotary compressor adapted to deliver the charge at constant pressure, a cooler for cooling the precompressed charge and charge controlling valve means associated with each of said cylinders, said valve means being timed to limit the volume of the charge confined in the cylinder for net cylinder compression to less than the volumetric capacity of the cylinder and to effect expansion of the ignited charge in the cylinder through an expansion ratio substantially greater than the net compression ratio of the charge in the cylinder.

17. An engine according to claim 16, characterized by the fact that the charge limiting means for each cylinder comprises inlet valve means for each cylinder timed to close only after the associated piston has rejected to the induction a portion of the previously inducted charge during the compression stroke.

18. An engine according to claim 16, characterized by the fact that the charge limiting means for each cylinder comprises exhaust valve means timed to close only after the associated piston has rejected a portion of the previously inducted charge to exhaust during the compression stroke.

19. An engine according to claim 16, characterized by the fact that the charge limiting means for each cylinder comprises inlet and exhaust valve means both timed to close only after the associated piston has rejected a portion of the previously inducted charge to the induction system and to the exhaust during the compression stroke.

20. An engine according to claim 16, characterized by the fact that the charge limiting means is timed to confine a charge in each cylinder for net compression therein the volume of which is not more than half the full volumetric capacity of the cylinder.

21. An engine according to claim 16, characterized by the provision of means for by-passing variable quantities of the charge delivered by the compressor to control the pressure thereof, and control means operative to substantially fully open the by-pass and render the compressor substantially ineffective whenever the control means is set in the positions corresponding to the lower load range of operation of the engine.

22. An engine according to claim 16, characterized by the provision of a throttle valve for governing flow of the charge to the engine, a by-pass for controlling the pressure of the charge delivered by the compressor to the inlet side of the throttle valve, a control valve for controlling flow through said by-pass, and control means interconnecting said valves, said control means being constructed to move one valve toward closed position while moving the other valve toward open position and vice versa and said valves being interconnected so that the respective valves are effective for different load ranges of operation of the engine, the control valve moving between closed position and substantially fully open position in the upper load range of operation of the engine and the throttle valve moving between closed position and substantially fully open position in the lower load range, the throttle valve opening and the control valve closing as the load increases from no load to full load.

23. An engine according to claim 16, characterized by the provision of a throttle valve, means for by-passing variable quantities of precompressed air delivered by the compressor, and a carbureter in the induction system between the by-pass and the throttle valve.

24. An engine according to claim 16, characterized by means for varying the precompression pressure of an air charge delivered to the engine to compensate for different engine loads, means for injecting metered quantities of fuel into the air charge, and means responsive to variations in the pressure of the precompressed air charge for varying the quantities of fuel injected.

25. An engine according to claim 16, characterized by means for varying the precompression pressure of an air charge delivered to the engine, a fuel pump for injecting fuel into the charge, regulating means operable at will to vary the fuel delivery from said pump, and means responsive to variations in said pressure to modify the action of said regulating means.

ALF LYSHOLM.